Figure 1:
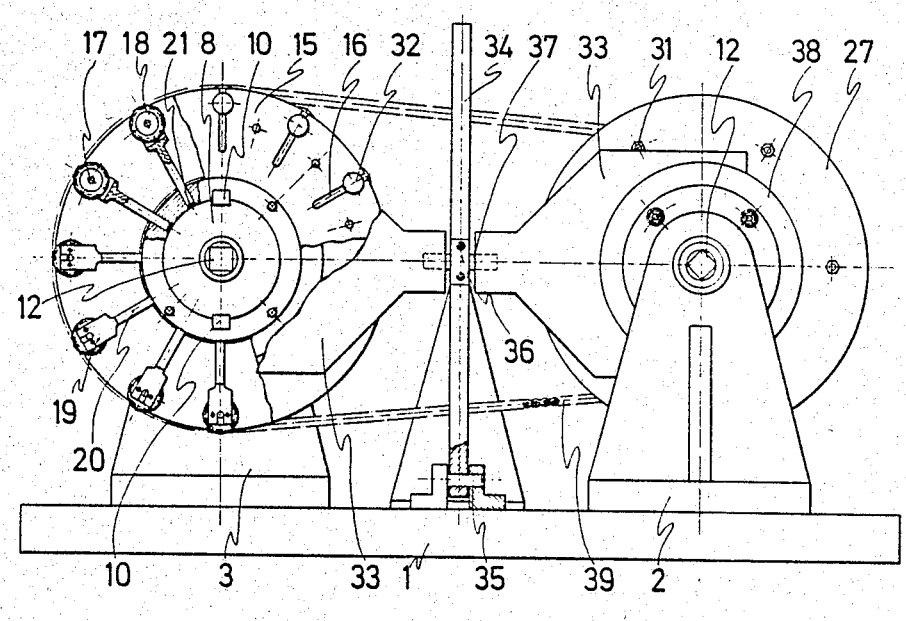

United States Patent [19]

Ybern Miró

[11] Patent Number: 4,529,394
[45] Date of Patent: Jul. 16, 1985

[54] TRANSMISSION RATIO VARIATORS

[76] Inventor: Pedro Ybern Miró, Guipuzcoa, 159 40 Barcelona, Spain

[21] Appl. No.: 408,772

[22] Filed: Aug. 17, 1982

[30] Foreign Application Priority Data

Sep. 9, 1981 [ES] Spain .................................. 505.342

[51] Int. Cl.³ .............................................. F16H 9/02
[52] U.S. Cl. ........................................ 474/49; 474/53
[58] Field of Search ...................... 474/52, 53, 54, 49, 474/162, 163

[56] References Cited

U.S. PATENT DOCUMENTS

| | | | |
|---|---|---|---|
| 740,829 | 10/1903 | Dumaresa | 474/53 |
| 1,092,098 | 3/1914 | Fitzgerald | 474/49 X |
| 1,379,504 | 5/1921 | Young | 474/53 |
| 1,614,266 | 1/1927 | Tschappat | 474/49 |
| 2,552,179 | 5/1951 | Kamp | 474/53 |

*Primary Examiner*—Stephen J. Novosad
*Assistant Examiner*—Frank H. McKenzie, Jr.
*Attorney, Agent, or Firm*—Wenderoth, Lind & Ponack

[57] ABSTRACT

A transmission ratio varying arrangement involves establishing transmission between a drive shaft and a driven shaft by two orbital systems, one for each shaft, and including gear wheels which move concentric to the respective shafts thereof. One orbital system is joined to the other by simple or composite conventional transmission elements, the radius of each orbit being variable simultaneously, maintaining the sum thereof constant. Each of the shafts is provided with an identical truncated thickening which is in direct position and which, acting as a wedge, contacts radial supports which are guided in holes made in a sleeve which is equally spaced from the holes and which is provided at its outer part with peripheral wings perpendicular to the shaft. The wings are provided with radial notches in which there are guided the shafts on which there rest the gear wheels which move when the thickened shaft and the sleeve turn in unison joined by keys. The shafts of the wheels are disposed on forks between the arms of which are radial supports which, through the holes of the sleeve, contact the truncated thickening of the shaft. Each shaft is displaceable in an opposite direction with respect to the other shaft, proportionally varying the radius of contact of the radial supports in one shaft with respect to the other, by maintaining the sum of both radii constant.

3 Claims, 3 Drawing Figures

TRANSMISSION RATIO VARIATORS

The object of the present invention relates to improvements in transmission ratio variators which permit an infinite variation of the relative speeds between a driven shaft and a drive shaft within a ratio of 1:1 to a point whereat the driven shaft rotates at a greater speed than the drive shaft, or vice versa. The variation in the speed between both shafts takes place continuously without steps, both in an increasing and a decreasing manner, and it can be produced in one direction or another from any intermediate ratio.

Thus, the invention to be described permits the maximum performance of an engine to be obtained by maintaining the speed of rotation of the output shaft thereof constant while the end shaft rotates at a suitable speed, which is variable depending on the operating conditions imposed thereon.

This effect can at present only be obtained by means of a system which, in one case, is manually operated while in the other it is automatic. We naturally refer to gearboxes having finite and rather concrete transmission ratios, causing the engine to increase and/or reduce its speed of rotation in order to cover all the needs which are clearly achieved by sacrifycing the optimum parameters and, therefore, at the expense of the consumption, effectiveness and duration of the engine.

Thus, the motor behaves in an abnormal manner, the rotation whereof having to be increased or reduced. This increases or reduces the power delivered thereby contrary to the ideal solution of maintaining the engine at a stable operating speed achieved with a lower fuel consumption and a smoother running, which implies an almost perfect economic use.

No precedents are known which could constitute prior art of the invention and, therefore, it refers to the practical realization of a novel and original idea in which, although departing from a known principle, the connection by means of a worm between two flywheels which rotate in a dependent manner on respective shafts, the constitution of the flywheels constitute an absolute novelty and is the basis of the invention.

Each one of the flywheels constitutes an orbital system incorporating gear wheels which are spaced from the shaft of the flywheel and form an assembly therewith.

The gear wheels of one flywheel are joined to the gear wheels of the other by simple or composite conventional transmission elements and said gear wheels describe orbits having like or different diameters. However, the sum of the diameters thereof is always constant, since when the diameter of one of the orbits is increased, the diameter of the other decreases in a like proportion.

The previously mentioned flywheels are comprised of sleeves which enclose the shafts resting on supports along which they move axially, while the sleeves are fixed.

The shafts are provided, in the part enclosed by the sleeve, with a thickening which, as will subsequently be seen, is a key element in the carrying out of the invention. The major part of said thickening is truncated and the side surface thereof forms an inclined plane which constitutes a strip acting as an operating wedge which determines the oribts of the gear wheels.

On the outside of the sleeves there are peripheric wings between which the shafts of the gear wheels are disposed. This movable joining has a radial displacement with respect to the shaft and, hence, the wings of the sleeves are provided with a plurality of faced radial notches in which there are guided the shafts on which there rest the gear wheels which move when the thickened shaft and the sleeve turn in unison joined by keys which, nevertheless, permit the thickened shaft, turning on its supports, to move axially along the inside of the sleeve.

Between the wings of each one of the sleeves there is provided as many holes as gear wheels, which pass to the interior and are located about the truncated thickening of the shaft. These holes are in alingment with the notches, and the notches of one wing face those of the other wing in perfect alignment to permit the shafts of the gear wheels to be operated, as will subsequently be described.

These shafts of the gear wheels are arranged on forks between whose arms there prolong the radial supports which, through the holes of the sleeves, contact the truncated thickening of the respective shafts. Thus, when one shaft is moved axially within its sleeve, the radial supports follow the side surface of the thickening, adapting to the diameter thereof, wherefore the diameter of the orbit in which the gear wheels move is varied.

The described variation is possible since the ends of the shafts of the gear wheels move along the radial notches made in the peripheric wings of the sleeve.

Thus the radial position of the shafts, i.e. the distance between the centre of the shaft on which the gear wheel rests and the centre of the thickened shaft, is determined by the position of the truncated thickening with respect to the radial supports.

The gear wheels of one of the sleeves are joined to the gear wheels of the other sleeve by means of belts, chains, cog belts or any other conventional means.

When one of the shafts rotate, the other shaft is forced to rotate. If the orbital diameters are alike, the speeds of one shaft and the other are also alike, but if the shafts are moved varying the support of the gear wheels, a variation of the speed between one shaft and the other will be obtained. The means used for this variation to be identical in one shaft and the other, so that the sum of the radii of both orbits is always the same, can be automatic or manual, purely mechanically operated, or electromechanically, electronically, pneumatically, or hydraulically controlled, or combined means, depending on whether the assembly is used with a drive system having a specific nature. A simple and reliable mechanical system which can be manually or automatically controlled will be described subsequently.

The invention can be summarized in that it consists in establishing the transmission between a driven shaft and a drive shaft by means of two orbital systems comprising gear wheels which move concentric to the respective shafts thereof, joining one orbital system to the other by simple or composite conventional transmission elements, the radii of each orbit being variable simultaneously by maintaining the sum thereof constant, each one of the shafts being provided with an identical truncated thickening, which is in a direct position and which, acting as a wedge, contact the radial supports which are guided in holes provided in a sleeve which equally spaced from the holes is provided at the outer part with peripheric wings perpendicular to the shaft, wings which are provided with radial notches in which there are guided shafts on which there rest the gear wheels which move when the thickened shaft and the sleeve rotate in unison joined by keys.

The shafts of the gear wheels are arranged on forks between the arms of which there prolong the radial supports which, through the holes of the sleeve, contact the truncated thickening of the shaft, which is movable in a direction opposite to that of the other shaft, proportionally varying the radius of contact of the radial supports in one shaft with respect to the other, maintaining the sum of both radii constant.

The ends of the shafts of the gear wheels move along the radial notches made in the peripheric wings of the sleeve, constituting the points of transmission of the movement. The radial position of the shafts of the gear wheels is determined by the position of the truncated thickening of the shaft with respect to the radial supports, the position of the thickenings being determined by a mechanical element comprised of a double fork which oscillates at its mid-point and is conventionally activated.

Between each one of the gear wheels and the shafts thereof, there is provided an adjustable tension clutch which constitutes a limiting element in the torque to be transmitted.

The sleeve is encircled by a ring slidable about a cylindrical strip made in the sleeve. Said ring incorporates a brake lining disc having by-pass holes to stems securely fixed to one of the wings of the sleeve and, with the help of an adjustable tension spring, presses on planes protruding from the shafts of the gear wheels, blocking or freeing them. The rings of both sleeves are controlled by a double fork activated by conventional means which act on a lateral strip emerging from the ring, at the edge opposite to the disc.

In accordance with the aforegoing, a prototype constituting a practical embodiment of the invention has been constructed and which is represented in the accompanying drawings without constituting a limitation of the real possibilities of the invention, since same could be simplified or improved without modifying the essential characteristics thereof.

Although the prototype is mainly to be used for static motors of machine tools or for the power transmission of agricultural implements, the use thereof is also indicated for cargo hoists, marine engines, auxiliary motors and in general in all those cases in which, maintaining the torque it is necessary to continuously vary the speed of the output shaft.

Figure 2:
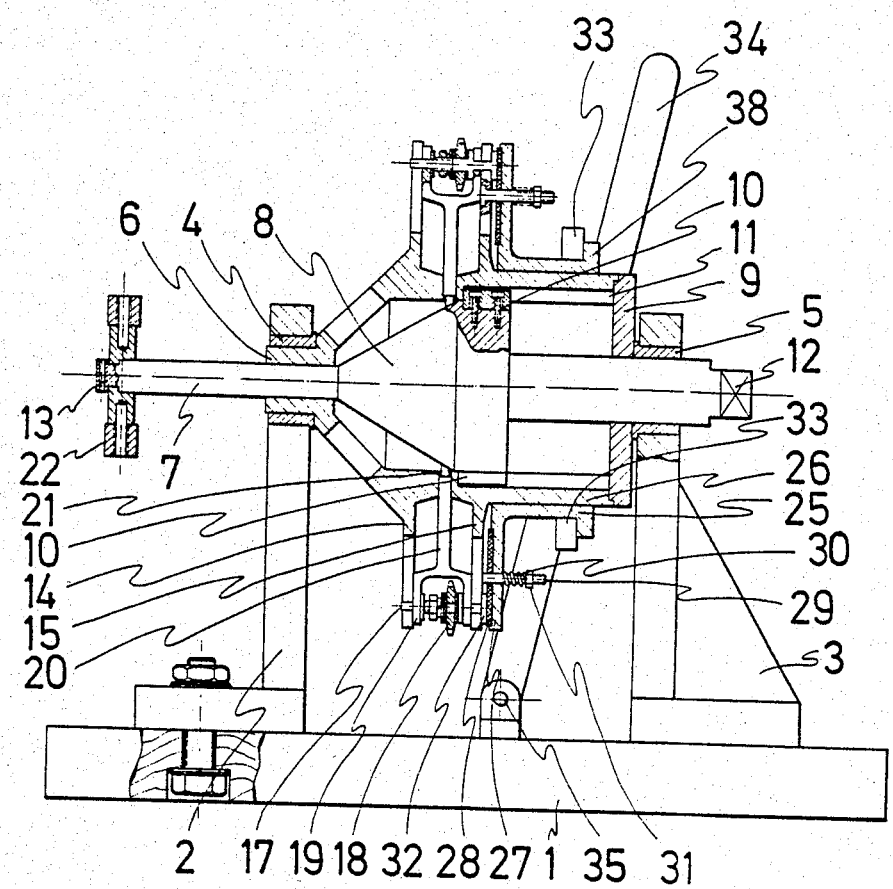

FIG. 1 represents an elevational view; FIG. 2 a profile view and FIG. 3 a plan view.

Referring to the drawings, it can be seen that on a base plate 1 there are disposed two sub bases comprised of laterals 2 and 3 along which the bearings 4–5 having different diameters move.

One side of the sleeve 6 adjusts to the bearing 4, while the other side thereof adjusts to the bearing 5, and in the inside of the sleeve there is incorporated the thickened shaft 7 whose thickening 8 serves as a wedge.

As can be seen in the drawing (FIG. 2) the sleeve 6 is hollow and is connected at its cover 9 to the bearing 5.

Between the sleeve 6 and the thickened shaft 7 there are disposed the keys 10 which move in the corresponding grooves 11 thereof, wherefore there is permitted an axial movement of the shaft 7 with respect to the sleeve, the radial connection thereof not being lost.

The shaft 7 is provided with a power take-off coupling 12 and the opposite end is provided with a head 13 for the control or activation element.

As illustrated in the drawings, the sleeve 6 is provided with peripheric wings 14 and 15 which are affected by the radial notches 16 in which there are guided the shafts 17 on which there rest the gear wheels 18 which move when the shaft 7 and its sleeve 6 turn in unison joined by the keys 10 thereof.

The shafts 17 of the gear wheels 18 are arranged on forks 19 between the arms of which there prolong the radial supports 20 which, through the holes 21 provided in the sleeve 6, contact the truncated thickening 8 of the shaft 7.

Figure 3:
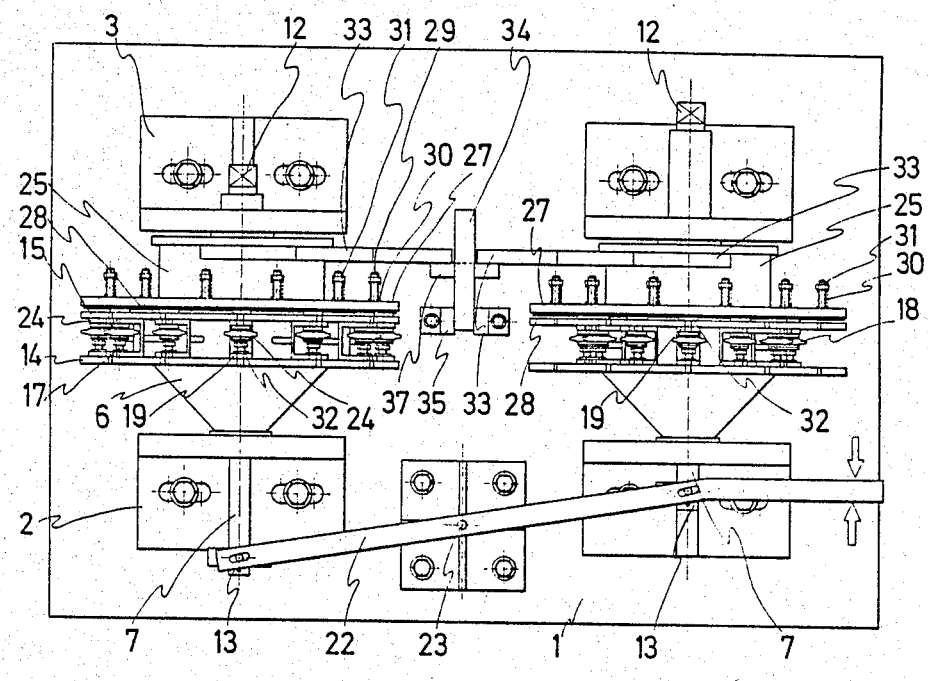

As illustrated in FIGS. 1 and 3, the shafts 17 are arranged in parallel and the mechanical system which produces the movements thereof in an axial direction with respect to the sleeves 6, moves them in opposite directions, so that the sum of the radii of the truncated thickenings 8, at the point whereat they contact the supports 20, is constant.

In accordance with the drawings and more specifically as illustrated in FIG. 3, the position of the truncated thickenings 8 with respect to the supports 20 is determined by a double fork 22 which oscillates at its mid-point 23 and is activated by conventional hydraulic, pneumatic, mechanical or combined means which to simplify the drawings, have not been represented but by way of example, act in one direction or the other as indicated by the arrows.

Each one of the gear wheels 18 is provided with a clutch 24 having an adjustable tension which constitutes a limiting element in the torque to be transmitted and insures a higher smoothness in the transmission, lengthening the life of the elements which join one planetary system to another.

Furthermore, the sleeve 6 is encircled by a ring 25 slidable about a cylindrical strip 26 made in the sleeve 6. Said ring 25 incorporates a disc 27 having an anti-skid lining (brake lining 28 and the disc 27 has holes through which stems 29 pass which, with the help of springs 30 having a tension adjustable by nuts 31, exert a homogenous pressure on the disc 27 which together with the lining 28 press in turn on planes 32 emerging from the shafts 17 of the gear wheels, blocking or releasing them to thereby facilitate operation of the gear wheels 18.

Finally, the rings 25 of both sleeves are controlled by a double fork 33 activated by conventional means, for example a lever arm 34 which rests on a joint 35 fixed to the base plate 1 and which at its mid-point 36 clamps, by means of a flange, the shaft 37 to which the double fork 33 is secured. As can be seen in FIGS. 2 and 3, the double fork 33 acts on a lateral strip 38 projecting from the ring 25 at the edge opposite to the disc 27.

Although the drawing representing the prototype illustrates a chain 39 as the transmission means, between the orbital systems, this cannot be taken as limitative since a cog belt can, for example, be used without introducing any modifications. Furthermore, more than one element could be used, i.e. double or triple belts or chains, wherefore twin gear wheels should be used, depending on the number of transmission elements 39 used.

Having reflected the basis of the invention in the drawings, we would state that it consists in establishing the transmission between a drive shaft 7 and a driven shaft 7 by the orbital systems of gear wheels 18 which move concentric to the respective shafts 7 thereof, one orbital system being joined to the other by conventional transmission means 39, simple or composite, the radii of each orbit being variable simultaneously by maintaining the sum thereof constant, wherefore the transmission ratio is variable without steps both in an increasing (by multiplying) and in a decreasing (by dividing) manner within a limit determined by the maximum orbital radius of one system with respect to the minimum orbital radius of the other system.

According to the aforegoing, one of the coupling heads 12 incorporates the output of the drive shaft while the other is connected to the input of the mechanism to be moved. Said mechanism could, as already mentioned, be any system which requires a variable speed of rotation such as, for example, the propeller of a ship, a variable flow pump, a dynamo, a tool, an agricultural implement, the transmission of a wheel of a vehicle, a conveyor belt, etc.

Once the shafts are connected and the drive element is in motion, both orbital systems start to rotate and, if the orbital diameters are alike, the number of input turns will be equal to the number of output turns.

However, when operating in any one of the directions indicated by the arrows on the arm of the double fork 22, one of the shafts 7 will be introduced through one side while it will be extracted through the other side with a like proportion. Precisely at this instant the position of the thickenings 8 is varied and since the heads 32 of each one of the shafts 17 are free, inasmuch as the lining 28 has been withdrawn by operating the arm of the lever 34 which motivates the outward movement of the ring 25 by the activation of the forks 33, compressing the springs 30, the shafts 17 are free and are varied positionally by the wedges constituted by the thickenings 8 on which the supports 20 of the forks 19 act.

The transmission element 39 always acts on the corresponding gear wheels 18 and when the torque results high or when the operating smoothness is by-passed, before a transmission pull is produced, the clutches 24 are released and the shaft 17 turns idly. When the desired transmission ratio is reached the arm of the lever 34 is freed and the springs 30 re-establish the pressure which blocks the heads 32 of each one of the shafts 17, fixing the orbit for centrifugal purposes.

A simple manner of resolving the operation of the double fork 22 is through a hydraulic or pneumatic dual-effect cylinder. A manually operated drum will also serve. In any of the cases a sensitive control element is required which can readily be controlled to effect the operation smoothly in perfect synchronism with the arm of the lever 34 which acts on the heads 32 of the shafts 17 through the brake lining 28.

As explained, the operation is very simple, it can be carried out rapidly and, therefore, the continuous variation in speed is carried out with absolute reliability, without pulls or steps, maintaining constant the tension of the transmission element between both orbital systems and perfectly controlling the effects obtained.

With the help of the electronic elements the system can be automatized so that the number of output turns per minute is constant without having to act on the engine, so that same operates at a constant speed under the best performance conditions.

I claim:

1. Improvements in transmission ratio variators, essentially characterised in that they consist in establishing the transmission between a drive shaft and a driven shaft by two orbital system, one for each shaft, comprising gear wheels which move concentric to the respective shafts thereof, one orbital system being joined to the other by simple or composite conventional transmission elements, the radius of each orbit being variable simultaneously, maintaining the sum thereof constant, each one of the shafts being provided with an identical truncated thickening which is in direct position and which acting as a wedge, contacts radial supports which are guided in holes made in a sleeve which, equally spaced from the holes and provided at its outer part with peripheric wings perpendicular to the shaft, which wings are provided with radial notches in which there are guided the shafts on which there rest the gear wheels which move when the thickened shaft and the sleeve turn in unison joined by keys, the shafts of the wheels being disposed on forks between the arms of which there prolong the radial supports which, through the holes of the sleeve, contact the truncated thickening of the shaft, said shaft being displaceable in an opposite direction with respect to the other shaft, proportionally varying the radius of contact of the radial supports in one shaft with respect to the other, by maintaining the sum of both radii constant.

2. Improvements in transmission ratio variators according to claim 1, essentially characterised in that the ends of the shafts of the gear wheels move along the radial notches made in the peripheric wings of the sleeve, constituting the points of transmission of the movement, the radial position of the shafts being determined by the position of the truncated thickening of the shaft with respect to the radial supports, the position of the thickenings in turn being determined by a double fork oscillating at its mid-point which is conventionally operated and each one of the gear wheels and the shaft thereof being provided with an adjustable tension clutch which constitutes a limiting element of the torque to be transmitted.

3. Improvements in transmission ratio variators according to claim 1 or 2, essentially characterised in that the sleeve is encircled by a ring slidable about a cylindrical strip made in the sleeve, which ring incorporates a disc having an anti-skid lining which is provided with holes through which there passes a stem secured to one of the wings of the sleeve and with the help of an adjustable tension spring, presses on planes protruding from the shafts of the gear wheels, blocking or releasing them, the rings of both sleeves being controlled by a double yoke operated by conventional means which act on a lateral strip protruding from the ring at the edge opposite to the disc.

* * * * *